Patented Apr. 3, 1951

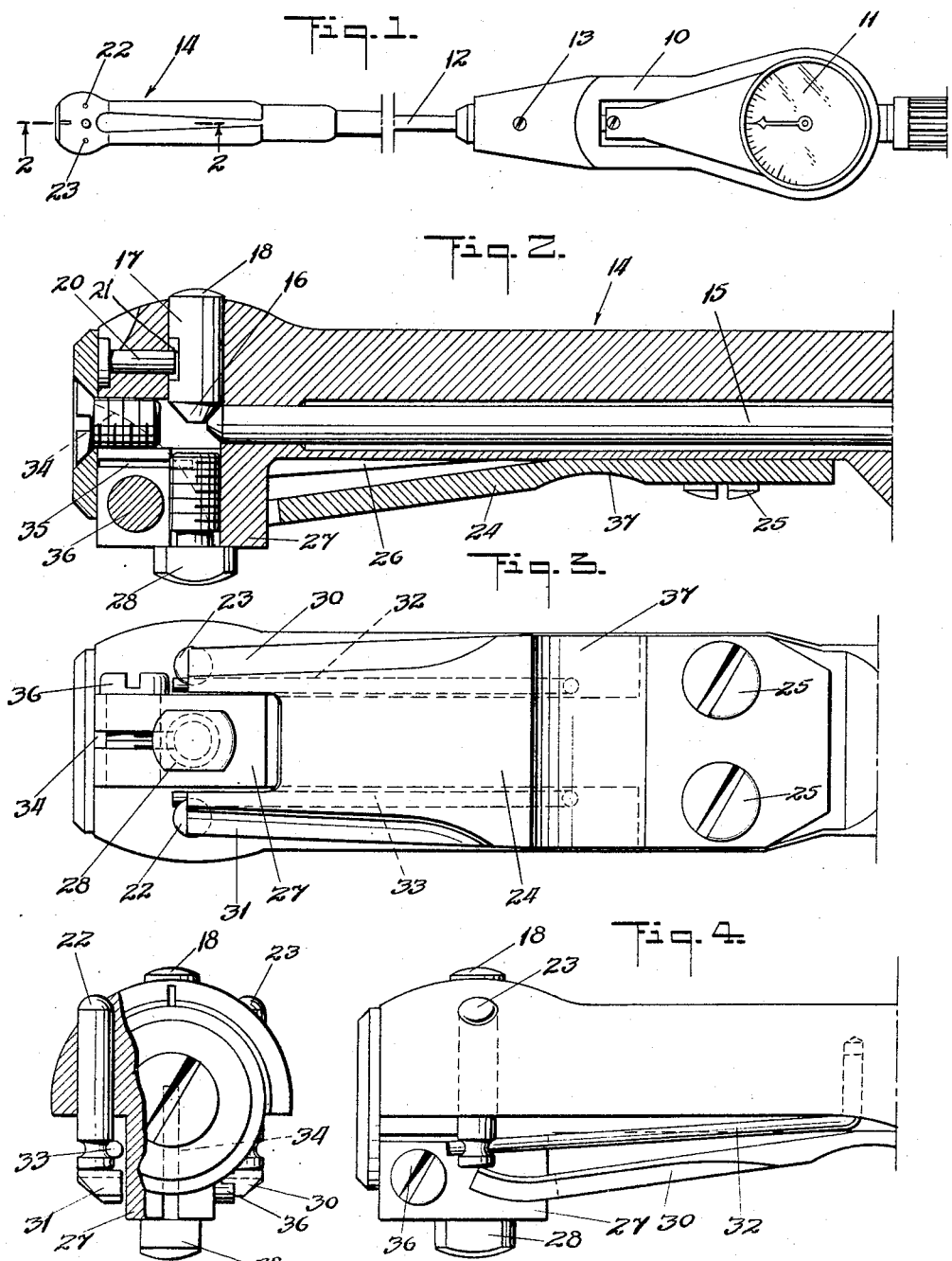

2,547,364

UNITED STATES PATENT OFFICE 2,547,364

GAUGE HEAD FOR SMALL BORES

Earl M. Boat, Poughkeepsie, N. Y., assignor to Standard Gage Company, Inc., Poughkeepsie, N. Y., a corporation of New York Application April 6, 1949, Serial No. 85,863

4 Claims. (Cl. 33—178)

1

The present invention relates to bore gages and particularly to bore gages of the dial type, that is, gages in which the indication of the measurement is given by means of the position of a pointer or hand on a cooperating dial.

More particularly still, the invention relates to a form of dial bore gage in which means are provided for centering the gaging head in a bore, these means being of such form as to render the gage usable in bores much smaller than any commonly measured with a centralizing type gage. A gage which was constructed in accordance with the present invention is capable of measuring bore having diameters of as little as $\frac{7}{32}$ inch (0.2188 inch).

In my application Serial No. 762,434, I have disclosed a gage which is adapted to the measurements of small bores but this gage while extremely advantageous for the measuring of bores of not less than 0.625 inch is not economical to manufacture for the measuring of bores much smaller than that dimension. In a sense, therefore, the gage of the present invention is an improvement upon that mentioned above.

It is an object of the present invention to provide a dial bore gage which is capable of accurately measuring small bores, i. e., bores of diameters of as little as $\frac{7}{32}$ inch.

It is another object of the invention to provide a centering means for the gage head which contributes to the first stated object.

It is still another object of the invention to provide a centering means in which the usual centering pins or plungers are located in bores parallel to the measuring plunger rather than at angles thereto which is customary when gages for measuring larger bores are constructed.

It is a further object of the invention to provide a dial bore gage capable of measuring extremely small bores in which the parts are few in number and readily assembled, thus rendering the gage economical to manufacture and maintain in service.

Other objects and features of the invention will be apparent when the following description is taken in connection with the annexed drawings in which—

Figure 1 is a top plan view of the dial bore gage of my invention;

Figure 2 is an enlarged longitudinal sectional view of the gaging head, the view being taken on the plane of the line 2—2 of Figure 1;

Figure 3 is a bottom plan view of the gaging head of the gage of Figure 1;

Figure 4 is a side elevation of the gaging head of the gage of Figure 1; and

2

Figure 5 is an end view of the gaging head, a portion of the cover being broken away in order to show the mode of holding the centering plungers in position.

Referring now to the drawings, the gage of my present invention comprises a housing member 10 in which a dial gage 11 is mounted, the gage shown being of the type disclosed in Emery Patent No. 2,226,756 of December 31, 1940, although any other dial indicator might be utilized, the housing of course being adapted to the gage which is to be utilized. Through the lefthand end of the housing as seen in Figure 1 a bore is provided into which a sleeve 12 is inserted and clamped in any suitable manner as, for example, by means of the set screw 13. The sleeve 12 is provided at its lefthand end with a gaging head generally designated 14, the lefthand end of which carries the measuring and centering plungers and performs the operation of gaging the diameter of a bore into which the gage is inserted. Extending through a central bore in the gaging head 14 and the sleeve 12 is a movement transmitting plunger 15 which is beveled at its lefthand end as seen in the drawings and makes contact with the inner beveled surface 16 of the measuring plunger 17. As shown, the beveled surface of the movement transmitting member and the inner beveled surface 16 of the measuring plunger are at a forty-five degree angle so that movement of the measuring plunger results in equal linear movement of the movement transmitting member 15.

As is usual in the construction of bore gages, the measuring plunger 17 terminates in a rounded surface 18. The movement of plunger 17 is limited by means of a pin 20 which is inserted in the gaging head and which protrudes into a slot 21 in the plunger 17. This pin 20 thus prevents the plunger from moving inwardly to such an extent that its inner beveled surface passes out of engagement with the beveled surface on the end of member 15 and likewise serves to prevent the plunger 17 from being displaced completely from the gaging head 14.

A pair of centering plungers 22 and 23 are provided, these plungers being located in bores whose axes lie in the same plane as the axis of the bore in which the measuring plunger 17 extends, all three axes being mutually parallel. The centering pins are pressed outwardly with respect to the top of the gaging head 14 by means of a resilient member or leaf spring 24 which is fastened in any suitable manner as, for example, by means of the screws 25, to the lower surface of the gaging head 14 which is provided with a flat portion 26, Figure 2, in order to give a bearing surface for the terminal or righthand end of the spring 24. At its lefthand end the lower surface of the gaging head 14 is provided with a projecting rib 27 which provides space for a measuring stud 28 as will be hereinafter described.

The spring 24 is bifurcated at its lefthand end so that it straddles the rib 27 and provides two terminal prongs, each of which is in contact with the lower protruding end of one of the centering pins 22—23. The centering plungers 22—23 are held in position against the terminal ends of the spring 24 which, for convenience, have been designated 30 and 31 by means of two resilient wires 32 and 33, which wires are held in position in the gaging head 14 by being bent over at their righthand ends and fixed in holes in the gaging head as is readily seen in Figure 4. At their lefthand ends the wires 32—33 cooperate with grooves in the lower ends of the pins 22 and 23, respectively, thus preventing the centering plungers 22 and 23 from being displaced from the gaging head and likewise holding those plungers in engagement with the ends 30 and 31 of the spring 24.

The measuring stud 28 previously mentioned cooperates with the measuring plunger 17 in measuring a bore. As is customary in gages of this type the range of the gage is modified by utilization of a measuring stud 28 having a greater or lesser dimension externally of the gaging head 14. In the particular gage here disclosed, the measuring stud 28 is screwed into position in the gaging head 14 in the manner shown, particularly in Figure 2. This stud is provided with a clamping means which consists of a split portion of the rib 27. As is indicated, particularly in Figure 2, a saw slot extends through the longitudinal center of the rib 27 terminating at the dotted line 34. In addition, a horizontal saw slot 35 is provided at the base of the rib 27 so that the entire lefthand portion of the rib 27 forms a clamp to engage the threaded portion of the stud 28. The clamp is utilized by the provision of a screw 36 which tightens it upon the stud 28. By means of this clamping arrangement, minor changes may be produced by rotation of the threaded stud; major changes, however, being cared for by replacement of the stud by a longer or shorter one in a manner as mentioned above.

The function of the centering pins 22 and 23 is identical with that described in my prior patent application, above mentioned, that is, they assure that the true diameter of the bore is measured rather than some lesser chord. It will be noted that since the spring 24 is relatively stiff and is provided with a thinner ground portion at 37, the two centering pins move in unison and thus serve to accurately center the gaging head in a bore. Further, due to the construction in which the lower surface of the gaging head is flattened and the spring inserted within the maximum diameter of the gaging head, it is possible to reduce that diameter and thus possible to gage the extremely small bores which have been discussed.

While I have described a preferred embodiment of my invention, it is obvious that other embodiments and constructions may be adopted without departing from the spirit thereof and, therefore, I desire to be limited not by the foregoing description but solely by the claims granted me.

What is claimed is:

1. In a dial bore gage adapted to the measurement of small bores and having a measuring head including a measuring plunger and means for transmitting movement of the plunger to a dial indicator, in combination, a pair of centering plungers slidably mounted in bores on either side of said measuring plunger, the axes of the three plungers being mutually parallel and lying in a common plane which is transverse to the axis of the gaging head, a flattened surface on the underside of said gaging head, said centering plungers extending beyond said flattened surface and a leaf spring mounted on said flattened surface, said spring having a bifurcated free end, one bifurcation engaging the protruding end of each said centering plungers to urge the plungers outwardly against the walls of a bore.

2. In a dial bore gage adapted to the measurement of small bores and having a measuring head including a measuring plunger and means for transmitting movement of the plunger to a dial indicator, in combination, a pair of centering plungers slidably mounted in bores on either side of said measuring plunger, the axes of the three plungers being mutually parallel and lying in a common plane which is transverse to the axis of the gaging head, a flattened surface on the underside of said gaging head, said centering plungers extending beyond said flattened surface, a leaf spring mounted on said flattened surface and engaging the protruding ends of said centering plungers to press them outwardly against the walls of a bore, and resilient means engaging said centering plungers and holding them against said leaf spring.

3. In a dial bore gage adapted to the measurement of small bores and having a measuring head including a measuring plunger and means for transmitting movement of the plunger to a dial indicator, in combination, a pair of centering plungers slidably mounted in bores on either side of said measuring plunger, the axes of the three plungers being mutually parallel and lying in a common plane which is transverse to the axis of the gaging head, a flattened surface on the underside of said gaging head, said centering plungers extending beyond said flattened surface, a leaf spring mounted on said flattened surface and engaging the protruding ends of said centering plungers to press them outwardly against the walls of a bore, grooves in the lower extending portions of said centering plungers and resilient wires lying in said grooves and being fixed in said gaging head to prevent said centering plungers from leaving said bores and to hold the lower ends thereof against said leaf spring.

4. In a dial bore gage adapted to the measurement of small bores and having a measuring head including a measuring plunger and means for transmitting movement of the plunger to a dial indicator, in combination, a pair of centering plungers slidably mounted in bores on either side of said measuring plunger, the axes of the three plungers being mutually parallel and lying in a common plane which is transverse to the axis of the gaging head, a flattened surface on the underside of said gaging head, said centering plungers extending beyond said flattened surface, a leaf spring mounted on said flattened surface and engaging the protruding ends of said centering plungers to press them outwardly against the walls of a bore, resilient means engaging said centering plungers and holding them against said leaf spring, a rib formed on the flattened lower surface of said gaging head, a measuring stud cooperating with the measuring plunger and adjustably fixed in a bore in said rib diametrically opposite the measuring plunger, saw slots extending longitudinally and transversely of said rib and intersecting said bore for said stud thereby forming contractible portions of said rib, and a transverse screw extending between said contractible portions to thereby clamp said stud in adjusted position.

EARL M. BOAT.

REFERENCES CITED

The following references are of record in the file of this patent:

UNITED STATES PATENTS

| Number | Name | Date |
|---|---|---|
| 2,253,803 | Newberry | Aug. 26, 1941 |
| 2,385,157 | Nilsson et al. | Sept. 18, 1945 |
| 2,429,511 | Emery | Oct. 21, 1947 |
| 2,443,880 | Aldeborgh et al. | June 22, 1948 |

FOREIGN PATENTS

| Number | Country | Date |
|---|---|---|
| 546,900 | Great Britain | Aug. 4, 1942 |

OTHER REFERENCES

American Machinist, May 23, 1946, page 194.